United States Patent
Lin et al.

(10) Patent No.: US 7,931,885 B2
(45) Date of Patent: Apr. 26, 2011

(54) METHOD OF PREPARING CARBON NANOTUBE COMPLEXES

(75) Inventors: Hong-Ming Lin, Taipei (TW); Wei-Syuan Lin, Taipei (TW); Wei-Jen Liu, Taipei (TW); Cheng-Han Chen, Taipei (TW)

(73) Assignees: Tatung University, Taipei (TW); Tatung Company, Taipei (TW)

( * ) Notice: Subject to any disclaimer, the term of this patent is extended or adjusted under 35 U.S.C. 154(b) by 162 days.

(21) Appl. No.: 12/382,576

(22) Filed: Mar. 19, 2009

(65) Prior Publication Data
US 2010/0172818 A1    Jul. 8, 2010

(30) Foreign Application Priority Data
Jan. 6, 2009   (TW) .............................. 98100170 A

(51) Int. Cl.
*D01F 9/12* (2006.01)

(52) U.S. Cl. .......... 423/447.1; 423/DIG. 40; 423/447.3; 423/460; 423/445 B; 977/745; 977/847

(58) Field of Classification Search ............. 423/445 B, 423/460, 447.1; 977/745, 847
See application file for complete search history.

(56) References Cited

U.S. PATENT DOCUMENTS

| | | | |
|---|---|---|---|
| 6,346,136 B1 * | 2/2002 | Chen et al. ..................... | 75/343 |
| 7,244,373 B1 * | 7/2007 | Anazawa et al. ............. | 252/500 |
| 2006/0165586 A1 * | 7/2006 | Wong et al. ................ | 423/447.1 |

* cited by examiner

*Primary Examiner* — Stuart Hendrickson
*Assistant Examiner* — Richard M Rump
(74) *Attorney, Agent, or Firm* — Bacon & Thomas, PLLC

(57) ABSTRACT

A method of fabricating carbon nanotube complex is disclosed, which comprises, (A) dispersing carbon nanotubes in a solvent; (B) adding a filler to the above solution to give a precursor solution; (C) performing light illumination on the precursor solution; (D) washing the solution after light exposure; and (E) drying to evaporate the solvent contained in the solution. Therefore, the carbon nanotube complex of the present invention is obtained.

24 Claims, 4 Drawing Sheets

METHOD OF PREPARING CARBON NANOTUBE COMPLEXES

BACKGROUND OF THE INVENTION

1. Field of the Invention

The present invention relates to a method of preparing carbon nanotube complexes and, more particularly, to a method of filling carbon nanotubes with materials such as metal particles, metal compounds, or a combination thereof.

2. Description of Related Art

A nano carbontube is a hollow tubule constituted from carbon atoms. The recent discovery and bulk synthesis of nano carbontubes has led to much speculation about possible uses of these graphic structures. Broughton and Pederson predicted on the basis of computer simulations that open nanotubes may be filled with liquid by capillary suction. In 1993, P. M. Ajayan and Sumio Iijima proved that the prediction is practicable by annealing nanotubes in the presence of liquid lead, which involved the opening of the tube ends, keeping them at 400° C. and subsequently filling of the tubes with material through capillary suction. However, only portions of nanotubes were filled with the desired material, and the uniformity of the distribution of those materials was unsatisfactory.

In 1994, C. Guerret-Plécourt et al. used capillary suction and successfully filled the tubes with several materials for forming continuous nanowires. Meanwhile, they investigated some chosen elements of various physical and chemical properties to separate the factors having a role in the growth mechanism of nanowires in carbon nanotubes (C. Guerret-Plécourt, Y. Le Bouar, A. Lolseau, H. Pascard. Nature 372 (1994) 761-765).

In 1994, D. Ugarte et al. adopted a physical way to fill nanotubes. They annealed nanotubes at several hundreds degrees Celsius and thus obtained nanotubes filled with silver nitrate filament. Other material such as lead oxide ($PbO_2$) have been used, however the reaction needed to be heated to 450° C. or the lead oxide would not enter the nanotubes (D. Ugarte, T. Stöck J. M. Bonard, A. Châtelain, W. A. de Heer. Appl. Phys. A 67 (1998) 101-105).

Filling hollow carbon nanotubes with chosen materials opens new possibilities of generating nearly one-dimensional nanostructures, and the method is generally as described below.

First, nanotubes are opened by oxidation in air; subsequently, the nanotubes are immersed in molten salts, then the materials enter the nanotubes to provide carbon nanotube complexes. Another way to provide carbon nanotube complexes is a wet impregnation method, which takes a long period of time, usually 12 hours or more, for immersing carbon nanotube in a prepared solution. Some further methods utilize catalysts, however many drawbacks occur and the results are inferior.

In the carbon nanotube complexes provided by the prior methods, disadvantages such as insufficient filling (i.e. some part of the cavity remains unfilled), nano-wire breaking (i.e. incontinuous nanowiring), non uniformity, or residue forming on the outer surface of the nanotubes may occur. Also, the prior methods may not be easy to execute because a high annealing temperature is often required and a long period of immersion time is involved. Therefore, it is desirable to provide an improved method to mitigate the aforementioned problems.

SUMMARY OF THE INVENTION

The object of the present invention is to provide a method of preparing carbon nanotube complexes, i.e. a method of filling carbon nanotubes with materials, which can be executed under room temperature. According to the method of preparing carbon nanotube complexes of the present invention, the reaction time can be reduced whereby lengthy immersion time of prior art processing is eliminated, and furthermore, catalysts can be excluded during the fabricating process.

The present invention provides a method of preparing carbon nanotube complexes, which comprises (A) dispersing carbon nanotubes in a solvent to form a carbon nanotube solution; (B) adding a filler to the dispersed nanotube solution to form a precursor solution; (C) performing light illumination on the precursor solution; (D) washing the illuminated precursor solution; and (E) drying to evaporate the solvent contained in the solution to obtain the carbon nanotube complexes.

According to the method of the present invention, the light used in the step (C) for light illumination preferably is a UV light, a X-ray light, or a combination thereof, but is not limited thereto. The wavelength of the light used in the step (C) for light illumination preferably is $10^{-5}$ to $10^{-12}$ meters. The energy of the light used in the step (C) for light illumination preferably is $10^{-1}$ eV or more. The light used in the step (C) for light illumination preferably is a light having a continuous wavelength, such as synchrotron radiation.

According to the method of the present invention, the dispersing process of step (A) preferably uses an ultrasonic vibration method or a magnetic stirring method to obtain a uniform distribution of the carbon nanotubes.

According to the method of the present invention, the filler of step (B) may be a metal particle, a metal compound, or a combination thereof. The metal particle preferably is one selected from the group consisting of Ti, Cr, Fe, Co, Ni, Cu, Zn, Mo, Pd, Sn, Ta, W, Gd, Dy, Yb, Bi, Ag, Au, Pd, Pt, Si, Ce, Ru, and an alloy thereof. The metal compound preferably is a metal ion compound, and the metal of the metal compound is preferably one selected from the group consisting of Ti, Cr, Fe, Co, Ni, Cu, Zn, Mo, Pd, Sn, Ta, W, Gd, Dy, Yb, Bi, Ag, Au, Pd, Pt, Si, Ce, and Ru. The metal compound is preferably one selected from the group consisting of a metal oxide, a metal salt, a metal halide, a metal nitrate, a metal phosphate, and a combination thereof. More preferably, the metal compound is a tin compound or a gold compound. When the metal compound is a tin compound, the metal compound most preferably is one selected from the group consisting of $SnCl_2.2H_2O$, $SnCl_4.5H_2O$, $Sn(NO_3)_2$, $Sn(NO_3)_4$, $SnOCl_2$, $Sn(SO_4)_2$, $Sn_3(PO_4)_2$, and $Sn_3(PO_4)_4$. Alternatively, when the metal compound is a gold compound, the metal compound most preferably is $HAuCl_4.6H_2O$.

According to the method of the present invention, the solvent of step (A) is preferably one selected from the group consisting of water, ethanol, methanol, isopropanol, ethanediol, a combination thereof, and the like.

According to the method of the present invention, the carbon nanotubes of step (A) are preferably multi-wall carbon nanotubes (MWCNTs).

According to the method of the present invention, preferably, water is used in the washing process of step (D).

According to the method of the present invention, the washing process of step (D) preferably uses a heat drying method or a vacuum drying method. When a heat drying method is used, the heating temperature is preferably 110° C.

Other objects, advantages, and novel features of the invention will become more apparent from the following detailed description when taken in conjunction with the accompanying drawings.

DETAILED DESCRIPTION OF THE PREFERRED EMBODIMENT

Example 1

Figure 1:
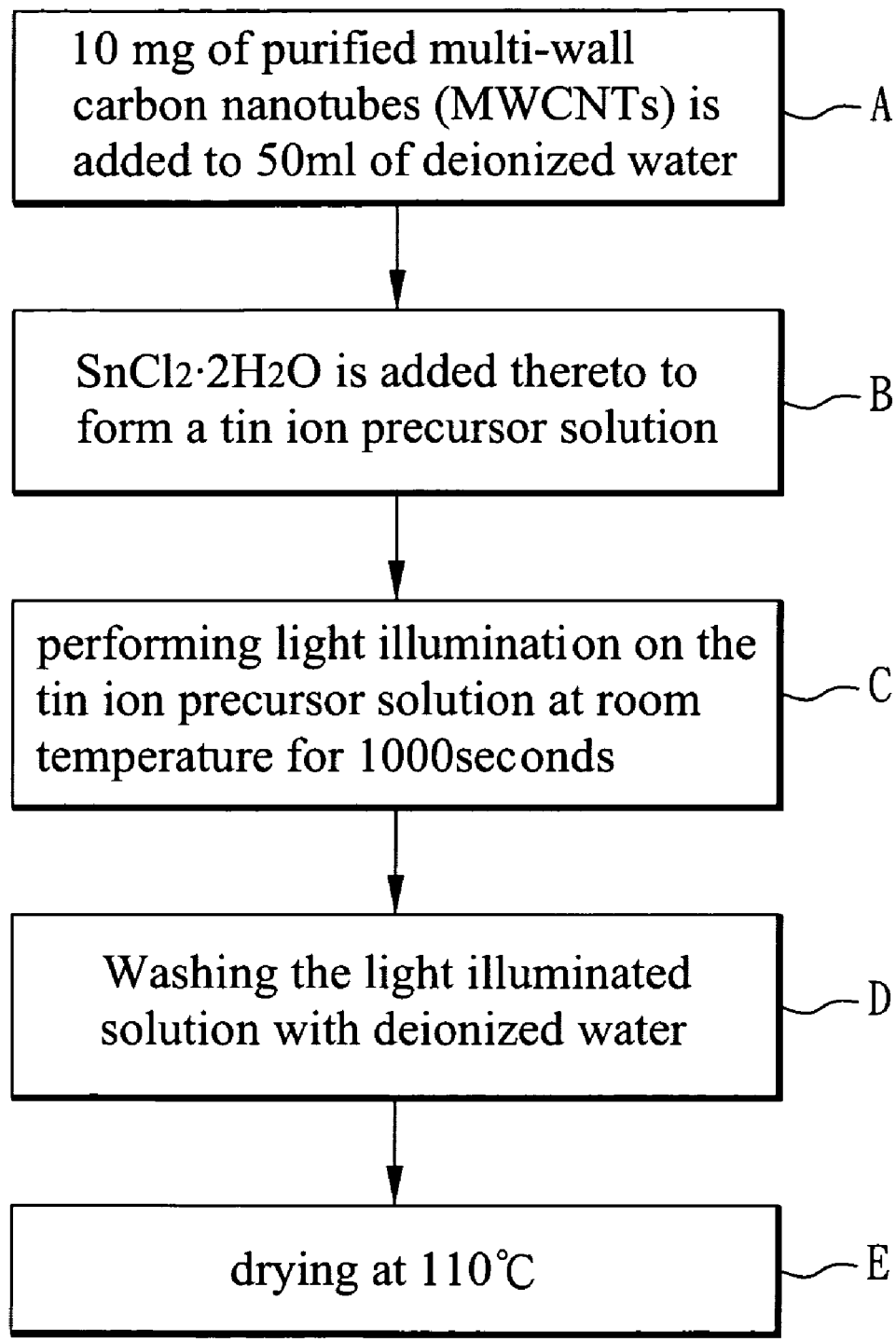
FIG. 1 is a process flow chart according to a preferred example of the present invention.

With reference to FIG. 1, there is shown a process flow chart of the present example. First, (A) 10 mg of purified multi-wall carbon nanotubes (MWCNTs) is added to 50 ml of deionized water, dispersed by ultrasonic vibration and magnetic stirring, and then (B) $SnCl_2.2H_2O$ is added thereto to form a tin ion precursor solution. Subsequently, (C) light illumination is performed on the tin ion precursor solution at room temperature for 1000 secs. In the present example, the light used for light illumination has a wavelength between $10^{-5}$ to $10^{-12}$ meter, and energy of $10^{-1}$ eV or above. (D) The light illuminated solution is then washed with deionized water. Finally, (E) the solution is dried at 110° C. to evaporate the solvent contained in the solution to obtain the carbon nanotube complexes. Therefore, the carbon nanotube complexes filled with tin compounds such as tin oxides are complete. According to the SEM photographic result, the tin compound filament provided by the present example can have a length of hundreds nano meters and above with excellent distribution uniformity of the filling tin compound.

Figure 2:
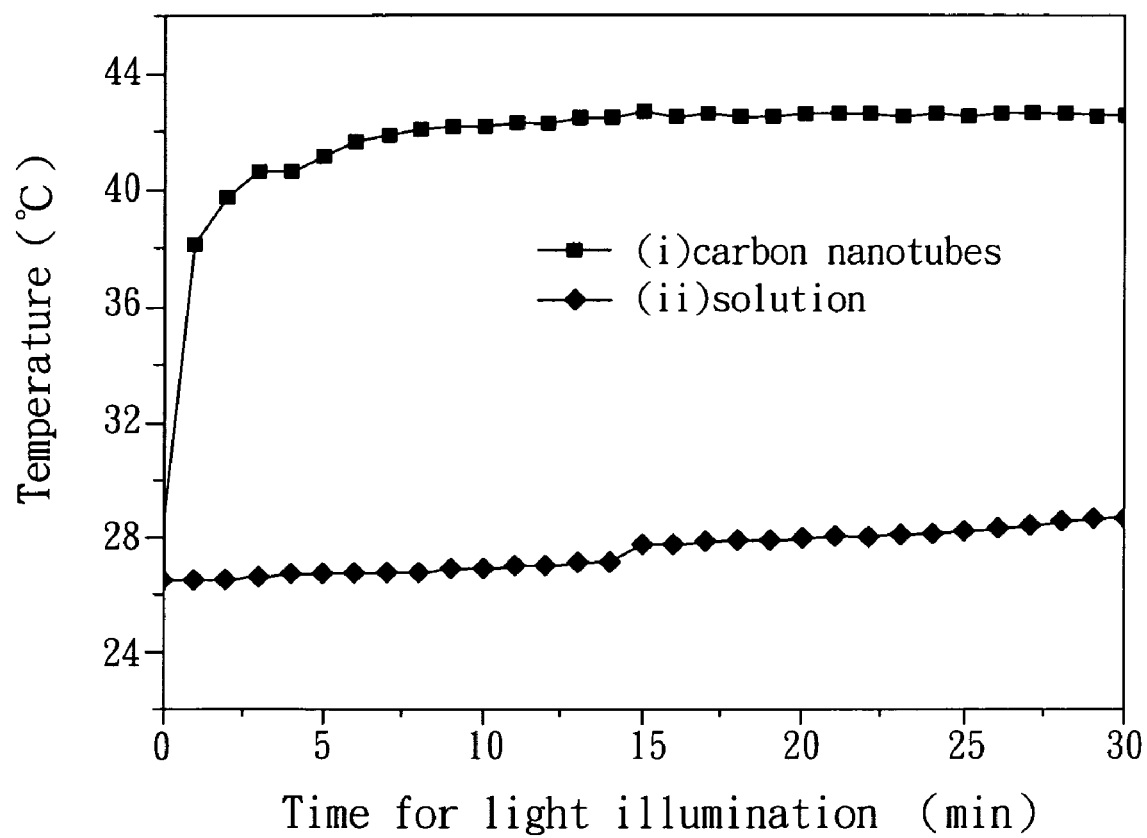
FIG. 2 is a temperature testing result in reference to a light illumination of the precursor solution at step (C) of the present invention.

In order to investigate the mechanism during the light illumination process of the present invention, observations of temperature change of the carbon nanotubes and the precursor solution are made, and the results are shown in FIG. 2. According to FIG. 2, which is a plot of time of light illuminating versus temperature change of the carbon nanotubes (i) and the precursor solution (ii), when a light having wavelength of $10^{-5}$ to $10^{-12}$ meter is exposed, the temperature of the carbon nanotubes (line (i)) increases to about 42° C. but the temperature of the precursor solution (line (ii)) is kept at room temperature. Thus a temperature gap between the carbon nanotubes and the solution is generated, more precisely, a temperature difference between the inside of the carbon nanotube and the outer environment of the carbon nanotube is created, therefore a convective flow between the inside and outside of the carbon nanotubes is provided, which enables the tin compounds (the fillers) to enter the carbon nanotubes uniformly to provide carbon nanotube complexes.

The efficiency of absorbing light at $10^{-5}$ to $10^{-12}$ m wavelength of carbon nanotube is much greater than that of the solution around the carbon nanotube. Therefore, when the light absorbed by the carbon nanotubes is transferred into heat, a strong convective flow is generated and the precursor solution can quickly enter the carbon nanotubes. Namely, the filament filling the carbon nanotube complexes of the present invention can have a longer length than that of the prior art, the compounds entering the cavity of the carbon nanotube complexes of the present invention are distributed more compactly and uniformly than those of the prior art, and fewer residues are left on the surfaces of the carbon nanotube complexes of the present invention. Furthermore, the method of providing carbon nanotube complexes of the present invention can be applied to industrial manufacturing because heat treatment in the prior art is eliminated therefore the cost can be lowered. Meanwhile, process time is reduced in the method of the present invention compared with the prior method that comprises a long period of heating time.

Example 2

Carbon nanotube complexes are prepared in the same way as the example 1, except that $Sn(NO_3)_4$ is used instead of $SnCl_2.2H_2O$.

Example 3

Carbon nanotube complexes are prepared in the same way as the example 1, except that $SnOCl_2$ is used instead of $SnCl_2.2H_2O$.

Example 4

Carbon nanotube complexes are prepared in the same way as the example 1, except that $Sn(SO_4)_2$ is used instead of $SnCl_2.2H_2O$.

Example 5

Carbon nanotube complexes are prepared in the same way as the example 1, except that $Sn_3(PO_4)_2$ is used instead of $SnCl_2.2H_2O$.

Example 6

Carbon nanotube complexes are prepared in the same way as the example 1, except that $Sn_3(PO_4)_4$ is used instead of $SnCl_2.2H_2O$.

Example 7

Carbon nanotube complexes are prepared in the same way as the example 1, except that $SnCl_4.5H_2O$ is used instead of $SnCl_2.2H_2O$.

Example 8

Carbon nanotube complexes are prepared in the same way as the example 1, except that $Sn(NO_3)_2$ is used instead of $SnCl_2.2H_2O$.

Example 9

Figure 3:
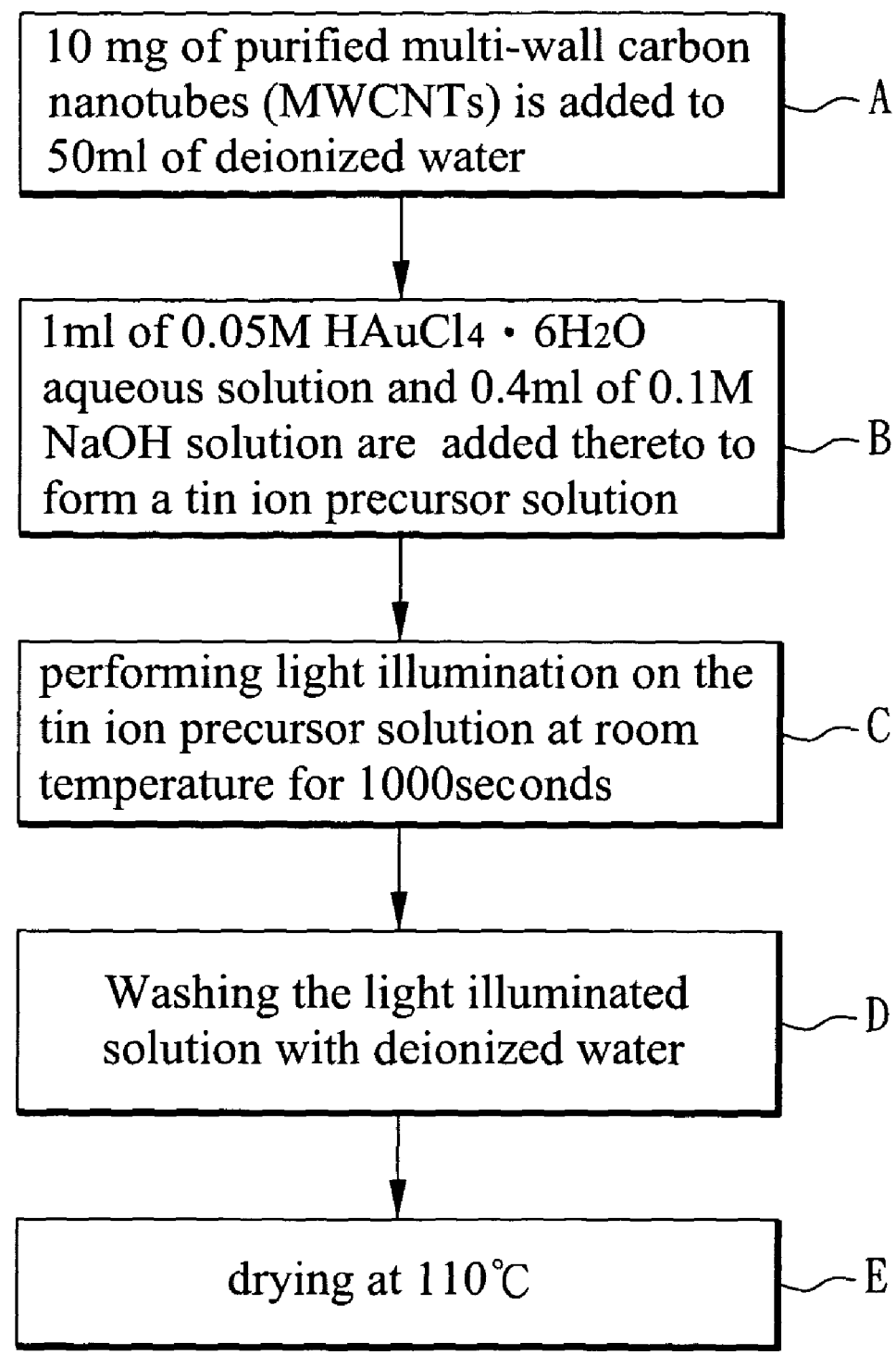
FIG. 3 is a process flow chart according to another preferred example of the present invention.

With reference to FIG. 3, there is shown a process flow chart of the present example. First, (A) 10 mg of purified multi-wall carbon nanotubes (MWCNTs) is added to 50 ml of deionized water, after being dispersed by ultrasonic vibration and magnetic stirring, (B) 1 ml of 0.05M $HAuCl_4.6H_2O$ aqueous solution and 0.4 ml of 0.1M NaOH solution are added thereto to form a gold ion precursor solution. Subsequently, step (C) comprises performing light illumination on the gold ion precursor solution at room temperature for 1000 secs. In the present example, the light used for light illumination is a hard X-ray. (D) Washing the light illuminated solution with deionized water. Finally, (E) drying at 110° C. to evaporate the solvent contained in the solution to obtain the carbon nanotube complexes. Therefore, the carbon nanotube complexes filled with gold particles are made.

According to the SEM photographic result of the carbon nanotube complexes of the present example, gold particles are successfully transferred into the cavities of the carbon nanotubes without undesirable residues being formed on the outer surface of the carbon nanotubes.

Comparative Example

Figure 4:
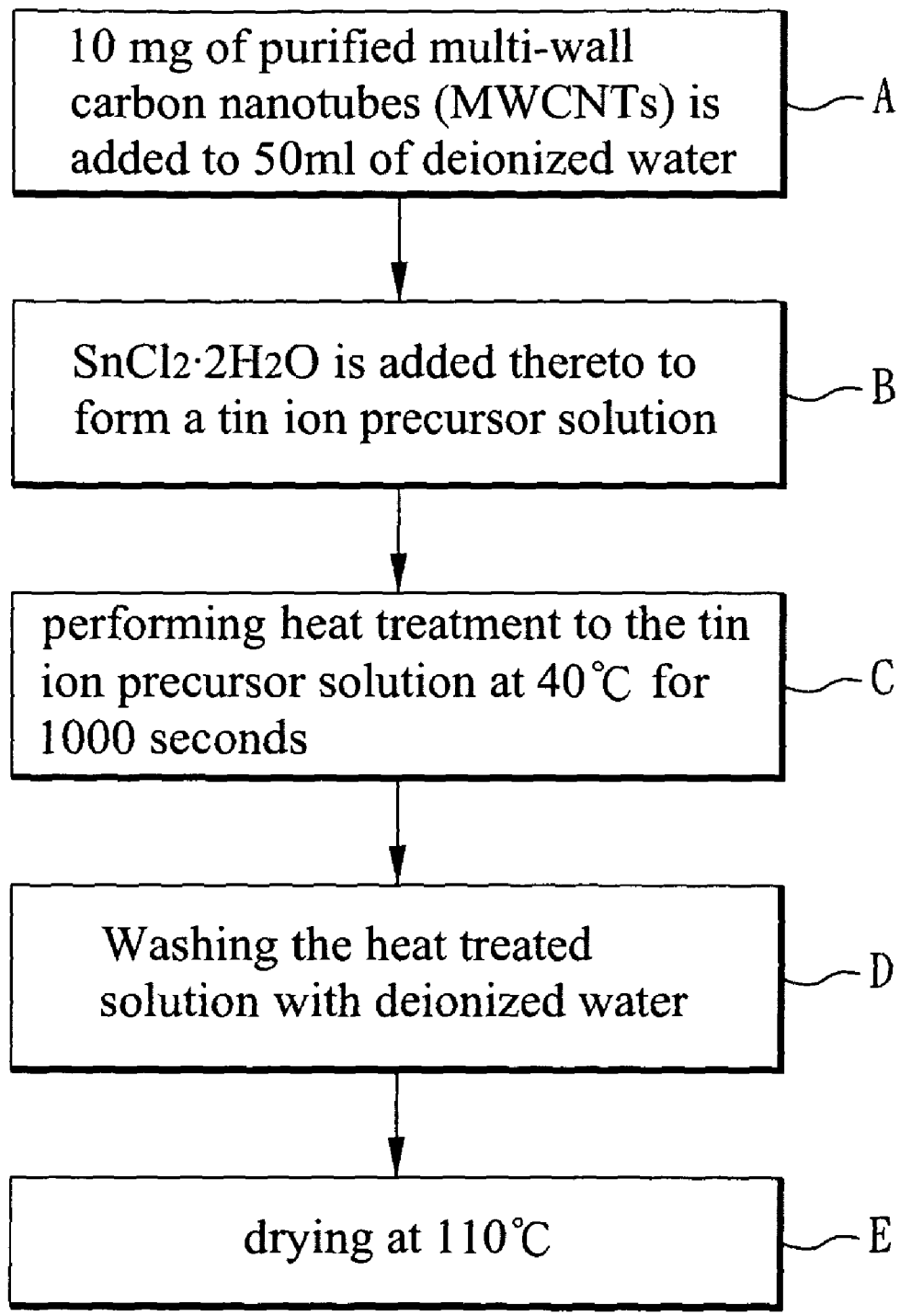
FIG. 4 is a process flow chart according to a comparative example of the present invention.

With reference to FIG. 4, there is shown a process flow chart of the present comparative example. First, (A) 10 mg of purified multi-wall carbon nanotubes (MWCNTs) is added to 50 ml of deionized water, after being dispersed by ultrasonic vibration and magnetic stirring for 30 mins, (B) 0.3 g of $SnCl_2 \cdot 2H_2O$ is added thereto to form a tin ion precursor solution. Subsequently, step (C) comprises performing heat treatment to the tin ion precursor solution at 40° C. for 1000 secs. Step (D) comprises washing the heat treated solution with deionized water. Finally, step comprises (E) drying at 110° C. to evaporate the solvent contained in the solution to obtain the carbon nanotube complexes.

The difference between the present comparative example and the above examples is that heat treatment is used in the present comparative example instead of light illumination. However, a temperature gap between the carbon nanotubes and the solution is not generated in the present comparative example, so the convective flow cannot increase therefore the fillers cannot enter the carbon nanotubes.

As mentioned above, the method of preparing carbon nanotube complexes of the present invention uses light illumination with the wavelength of $10^{-5}$ to $10^{-12}$ m therefore fillers can be deposited in the cavity of the carbon nanotubes even though no heat treatment is performed. Besides, the process time is reduced in the method of the present invention compared with the prior method comprising a long period of heating time. Also, catalysts are not needed in the method of the present invention so the manufacturing cost is kept low. Therefore, the method of the present invention is in fact a simple, efficient, industrially applicable method for preparing carbon nanotube complexes.

Although the present invention has been explained in relation to its preferred examples, it is to be understood that many other possible modifications and variations can be made without departing from the scope of the invention as hereinafter claimed.

What is claimed is:

1. A method of preparing carbon nanotube complexes, which comprises:
   (A) dispersing carbon nanotubes in a solvent to form a carbon nanotube solution;
   (B) adding a filler to the dispersed nanotube solution to form a precursor solution;
   (C) performing light illumination on the precursor solution;
   (D) washing the illuminated precursor solution; and
   (E) drying to evaporate the solvent contained in the solution to obtain the carbon nanotube complexes,
   wherein a light used in step (C) for light illumination is an X-ray light.

2. The method as claimed in claim 1, wherein the wavelength of the light used in the step (C) for light illumination is $10^{-8}$ to $10^{-11}$ meters.

3. The method as claimed in claim 1, wherein the energy of the light used in the step (C) for light illumination is $10^{-1}$ eV or more.

4. The method as claimed in claim 1, wherein the light used in the step (C) for light illumination comprises a continuous wavelength.

5. The method as claimed in claim 1, wherein the filler of step (B) is a metal particle, a metal compound, or a combination thereof.

6. The method as claimed in claim 5, wherein the metal particle is one selected from the group consisting of Ti, Cr, Fe, Co, Ni, Cu, Zn, Mo, Pd, Sn, Ta, W, Gd, Dy, Yb, Bi, Ag, Au, Pd, Pt, Si, Ce, Ru, and an alloy thereof.

7. The method as claimed in claim 5, wherein the metal of the metal compound is one selected from the group consisting of Ti, Cr, Fe, Co, Ni, Cu, Zn, Mo, Pd, Sn, Ta, W, Gd, Dy, Yb, Bi, Ag, Au, Pd, Pt, Si, Ce, and Ru.

8. The method as claimed in claim 5, wherein the metal compound is one selected from the group consisting of a metal oxide, a metal halide, a metal nitrate, a metal phosphate, and a combination thereof.

9. The method as claimed in claim 7, wherein the metal compound is a tin compound.

10. The method as claimed in claim 9, wherein the tin compound is one selected from the group consisting of $SnCl_2 \cdot 2H_2O$, $SnCl_4 \cdot 5H_2O$, $Sn(NO_3)_2$, $Sn(NO_3)_4$, $SnOCl_2$, $Sn(SO_4)_2$, $Sn_3(PO_4)_2$, and $Sn_3(PO_4)_4$.

11. The method as claimed in claim 7, wherein the metal compound is a gold compound.

12. The method as claimed in claim 11, wherein the gold compound is $HAuCl_4 \cdot 6H_2O$.

13. The method as claimed in claim 1, wherein the dispersing process of step (A) uses an ultrasonic vibration method.

14. The method as claimed in claim 1, wherein the dispersing process of step (A) uses a magnetic stirring method.

15. The method as claimed in claim 1, wherein the solvent of step (A) is one selected from the group consisting of water, ethanol, methanol, isopropanol, ethanediol, and a combination thereof.

16. The method as claimed in claim 1, wherein the carbon nanotubes of step (A) are multi-wall carbon nanotubes (MWCNTs).

17. The method as claimed in claim 1, wherein water is used in the washing process of step (D).

18. The method as claimed in claim 1, wherein the washing process of step (D) uses a heat drying method or a vacuum drying method.

19. A method of preparing carbon nanotube complexes, which comprises:
   (A) dispersing carbon nanotubes in a solvent to form a carbon nanotube solution;
   (B) adding a filler to the dispersed nanotube solution to form a precursor solution, wherein the filler is a tin compound;
   (C) performing light illumination on the precursor solution;
   (D) washing the illuminated precursor solution; and
   (E) drying to evaporate the solvent contained in the solution to obtain the carbon nanotube complexes.

20. The method as claimed in claim 19, wherein the light used in step (C) for light illumination is a UV light, an X-ray light, or a combination thereof.

21. The method as claimed in claim 19, wherein the wavelength of the light used in the step (C) for light illumination is $10^{-5}$ to $10^{-12}$ meters.

22. The method as claimed in claim 19, wherein the light used in the step (C) for light illumination comprises a continuous wavelength.

23. The method as claimed in claim 19, wherein the tin compound is one selected from the group consisting of $SnCl_2 \cdot 2H_2O$, $SnCl_4 \cdot 5H_2O$, $Sn(NO_3)_2$, $Sn(NO_3)_4$, $SnOCl_2$, $Sn(SO_4)_2$, $Sn_3(PO_4)_2$, and $Sn_3(PO_4)_4$.

24. The method as claimed in claim 19, wherein the solvent of step (A) is one selected from the group consisting of water, ethanol, methanol, isopropanol, ethanediol, and a combination thereof.

* * * * *